(12) United States Patent
Vienne et al.

(10) Patent No.: US 9,231,447 B2
(45) Date of Patent: Jan. 5, 2016

(54) STATOR WINDING OF AN ELECTRIC GENERATOR

(71) Applicant: ALSTOM Technology Ltd, Baden (CH)

(72) Inventors: Grégoire Vienne, Fribourg (CH); Johann Haldemann, Birr (CH); Not-Curdin Fried, Hausen (CH); Hossein Safari Zadeh, Othmarsingen (CH)

(73) Assignee: ALSTOM TECHNOLOGY LTD (CH)

( * ) Notice: Subject to any disclaimer, the term of this patent is extended or adjusted under 35 U.S.C. 154(b) by 0 days.

(21) Appl. No.: 14/264,505

(22) Filed: Apr. 29, 2014

(65) Prior Publication Data

US 2014/0319946 A1   Oct. 30, 2014

(30) Foreign Application Priority Data

Apr. 30, 2013 (EP) .................................... 13166001

(51) Int. Cl.
*H02K 3/12* (2006.01)
*H02K 3/28* (2006.01)
*H02K 19/16* (2006.01)

(52) U.S. Cl.
CPC *H02K 3/28* (2013.01); *H02K 19/16* (2013.01); *H02K 2213/03* (2013.01)

(58) Field of Classification Search
CPC ................................. H02K 3/12; H02K 3/28
USPC ........................................ 310/184, 200–209
See application file for complete search history.

(56) References Cited

U.S. PATENT DOCUMENTS

| | | | |
|---|---|---|---|
| 3,594,595 A * | 7/1971 | Williams et al. | 310/168 |
| 4,309,634 A * | 1/1982 | Koroly et al. | 310/201 |
| 4,751,448 A | 6/1988 | Auinger | |
| 6,424,114 B1 * | 7/2002 | Komatsu | 318/721 |
| 8,581,466 B2 * | 11/2013 | Patel et al. | 310/201 |
| 2008/0079400 A1 * | 4/2008 | Lacaze | 322/20 |
| 2012/0025660 A1 * | 2/2012 | Patel et al. | 310/201 |

FOREIGN PATENT DOCUMENTS

| | | |
|---|---|---|
| EP | 0 370 166 | 5/1990 |
| EP | 0 557 809 | 9/1993 |
| EP | 1 864 375 | 12/2007 |

(Continued)

OTHER PUBLICATIONS

IEEE Transactions on Power Apparatus and Systems, vol. PAS-89, No. 8, Stator Winding Systems with Reduced Vibratory Forces for Large Turbine-Generators, Ch. H. Holley et al., Nov./Dec. 1970.

(Continued)

*Primary Examiner* — Naishadh Desai
(74) *Attorney, Agent, or Firm* — Cantor Colburn LLP

(57) ABSTRACT

Apparatus for producing electrical power from mechanical power, includes an electric generator with a rotor and with a stator. The electric generator is configured for conversion of mechanical power into a polyphase alternating current. The polyphase alternating current has more than three phases. The stator has a stator core with a stator bore. The stator core provides a plurality of stator slots arranged at a distance from one another. A plurality of coil portions are inserted in the stator slots, and the coil portions are connected to form coils. The coils include a plurality of Z-shaped portions and are laid out in a wave pattern.

13 Claims, 3 Drawing Sheets

(56) References Cited

FOREIGN PATENT DOCUMENTS

| | | |
|---|---|---|
| WO | 92/07406 | 4/1992 |
| WO | 2006/103159 | 10/2006 |
| WO | 2010/070144 | 6/2010 |

OTHER PUBLICATIONS

Fig. 4.18 of P. Sen. Principles of Electric Machines and Power Electronics, John Wiley and Sons, $2^{nd}$ Edition, 1997.

* cited by examiner

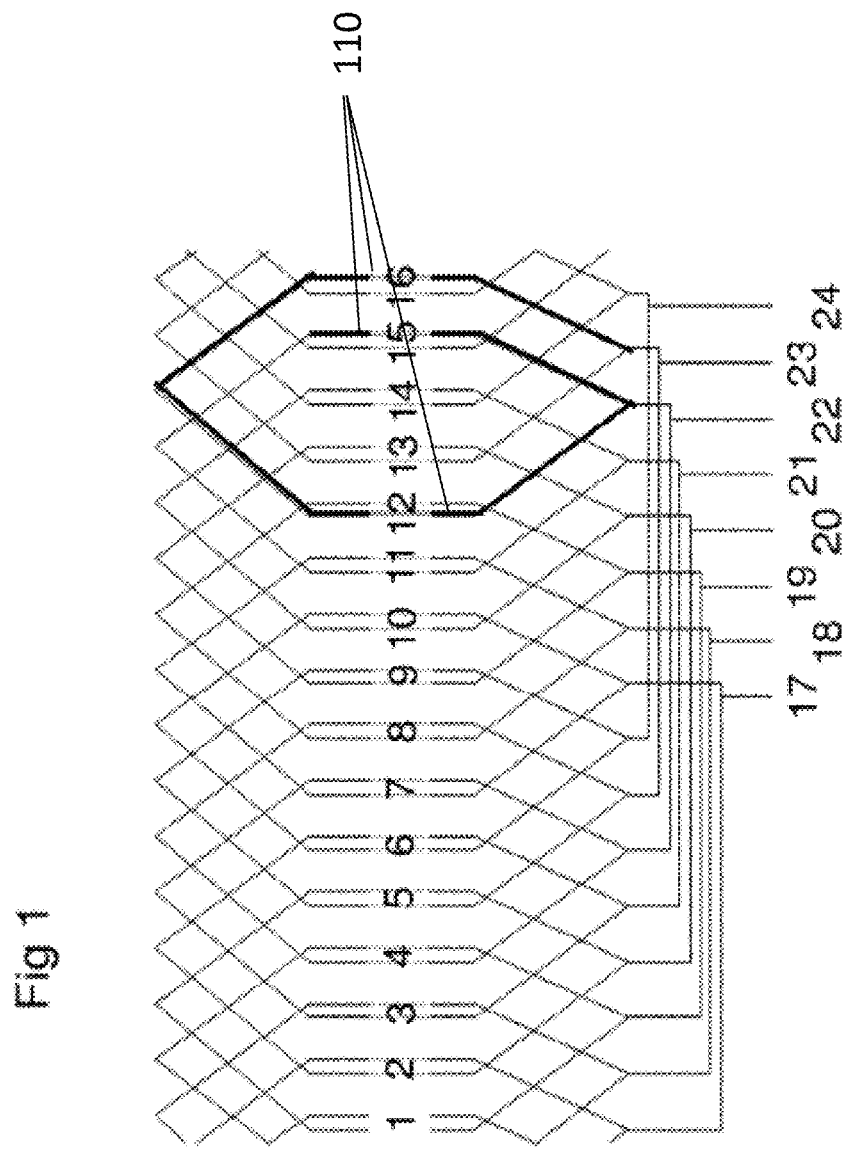

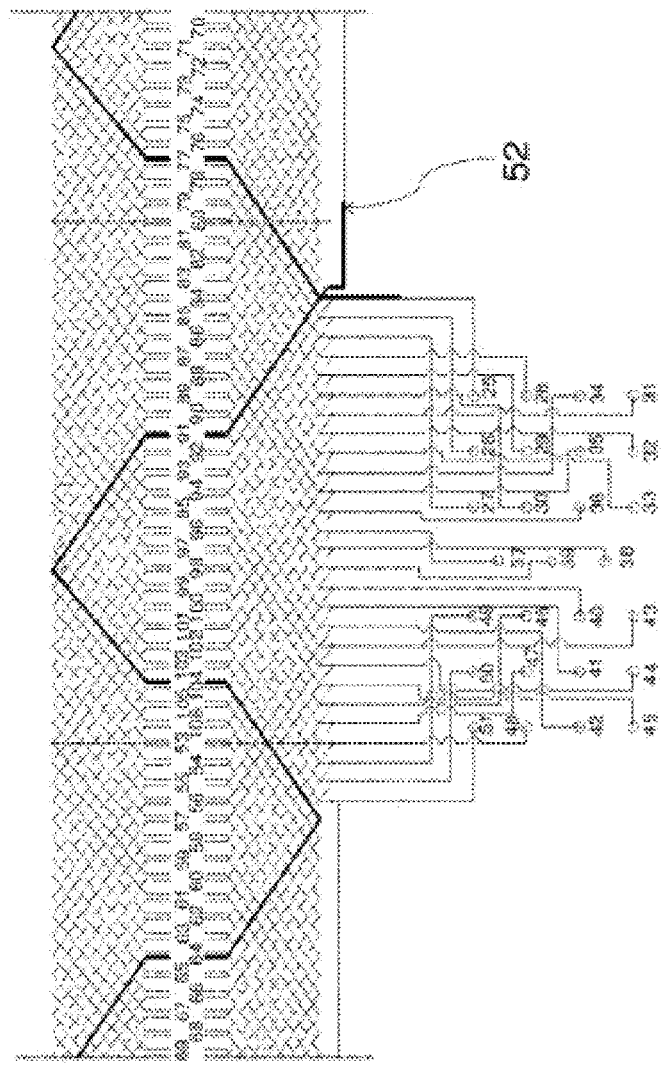

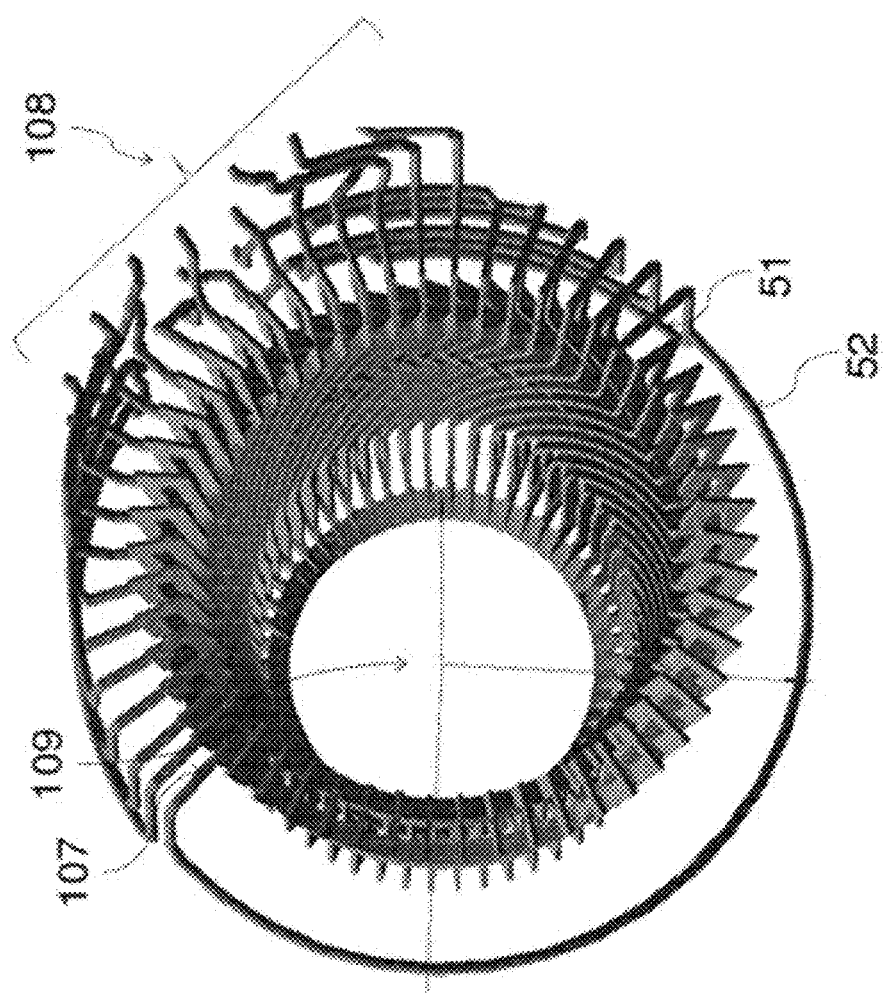

STATOR WINDING OF AN ELECTRIC GENERATOR

CROSS-REFERENCE TO RELATED APPLICATIONS

This application claims priority to European application 13166001.1 filed Apr. 30, 2013, the contents of which are hereby incorporated in its entirety.

TECHNICAL FIELD

The present disclosure relates to a stator winding of an electric generator. More particularly, the present disclosure relates to an improved winding scheme of a stator of a four-pole turbogenerator.

BACKGROUND

An electric generator comprises a rotor arranged inside a stator. The rotor turns at a frequency $$f_{mech}[\text{rpm}] = \frac{2 \cdot f_{el}[\text{Hz}] \cdot 60}{P}, \qquad (1)$$

Where P is the number of poles of the machine and $f_{el}$ is the electrical frequency of the network. Electric generators are typically synchronous machines, so the electrical frequency would be $f_{el}$=50 Hz or 60 Hz. Consequently, the rotor of a two-pole electric generator (P=2) turns at 3000 rpm in 50 Hz networks and at 3600 rpm in 60 Hz networks. The rotor of a four-pole electric generator (P=4) will turn at 1500 rpm in 50 Hz networks and at 1800 rpm in 60 Hz networks.

The stator comprises a stator core with a plurality of slots. The slots are arranged in between teeth. Both the teeth and the slots are essentially parallel to the axis of the rotor. The rotor is arranged inside a cylindrical bore in the center of the stator core. That bore is often referred to as the stator bore. The stator slots are open towards the stator bore.

When the electric generator is a three-phase synchronous machine, the number of slots is often a multiple of six. Typically, a stator comprises 36, 42, 48, 54, or 60 slots and an equal number of teeth.

The winding of a stator is typically made up of stator bars arranged inside the slots. Most windings of large electric generators are double-layer windings. A double-layer winding provides a top position and a bottom position inside each slot. In stators with double-layer windings, a coil comprises two stator bars and typically occupies the top position of a first slot and the bottom position of a second slot.

Each stator bar comprises conductors which carry the current. On one side of the stator, the two stator bars of the same coil leave their stator slots and are electrically connected. This pairwise electrical connection is commonly referred to as the end-winding and electrically closes the circuit. On the other side of the stator, a lead is brought out from each stator bar. The leads are then used to complete the stator winding by connecting the stator bars among each other. They leads may also be used to connect the three-phase output of the generator.

Different schemes exist to connect the coils of a stator winding. When the winding is arranged as a lap winding, several of the coils of each phase are electrically connected in series.

A modest increase in the mechanical frequency of the rotor often yields a reduction in size and improved efficiency of an electric generator. An increased frequency $f_{mech}$ of the rotor would, however, also result in an increase of the electrical frequency $f_{el}$ of the three-phase output of the generator. To vary the electrical frequency $f_{el}$, a combination of an electric generator and of frequency conversion through AC/AC conversion provides a technical solution. The application WO 2006/103159 discloses such a combination of an electric generator and of AC/AC conversion. FIG. 3b of WO 2006/103159 discloses a polygonal winding, with a plurality of series-connected (lap-wound) coils. The embodiment shown on FIG. 3b of WO 2006/103159 shows a winding with 54 slots and 18 bidirectional switches. In other words, the polygonal winding of FIG. 3b consists of groups of three series-connected coils. Each of these groups provides one phase of the polyphase (18-phase) output of the winding. To generator three-phase output, the groups of series-connected coils are connected to three busbars through a total of 18 bidirectional switches.

The arrangement of 18 bidirectional switches feeding three busbars is also referred to as an 18×3 matrix converter. The 18×3 matrix converter provides AC/AC conversion by connecting and disconnecting the individual phases of the polyphase output to and from the three-phase output of the electric generator.

The matrix converter of WO 2006/103159 converts the electrical frequency of the three-phase output of the electric generator downwards. The embodiment disclosed by WO 2006/103159 can thus be used to convert 60 Hz three-phase output to 50 Hz three-phase output. To generate 60 Hz output, an electrical frequency $f_{el}$ of 100 Hz needs to be converted to 60 Hz.

According to equation (1) the rotor of a two-pole electric generator (P=2) would have to rotate at $f_{mech}$=6000 rpm in order to provide $f_{el}$=100 Hz. In gas-powered plants, the electric generator is driven by a gas-turbine or steam turbine. A mechanical frequency of $f_{mech}$=6000 rpm would then require not only modifications of the electric generator but also a gas-turbine engine designed for $f_{mech}$=6000 rpm. There is thus a need to obtain three-phase output at $f_{el}$=60 Hz from an electric generator whose rotor turns at $f_{mech}$=3000 rpm.

Equation (1) implies an electrical frequency $f_{el}$ of 100 Hz can readily be obtained by increasing the number of poles from P=2 to P=4. The electrical frequency of 100 Hz could then be converted to $f_{el}$=60 Hz through a matrix converter. It is, however, not straightforward to modify the stator winding accordingly. A change from a two-pole rotor to a four-pole rotor also impacts on the symmetry of the stator winding. Opposite sides of the stator winding will now experience the same value and direction of magnetic flux. Corresponding coils on opposite sides of the stator should thus either be connected in parallel or in series. If opposite coils were not connected together to form one phase, then twice as many bidirectional switches would be necessary to maintain the same number of switches per pole. In applied to the winding shown on FIG. 3b of WO2006/103159, the result would be a winding with 36 bidirectional switches. There would also be a fractional number of (1.5) series-connected coils per bidirectional switch.

If corresponding coils on opposite sides of the stator were connected in parallel, the number of series-connected coils per bidirectional switch would be cut in half. Consequently, the three-phase output voltage would be lower by a factor two and the current would be higher by the same factor. Since the forces between conductors follow the square of the current, a winding scheme which delivers twice the current would need additional mechanical reinforcement and an especially got cooling system to compensate for the losses causes by the high current.

If the bidirectional switches were made of thyristors, any misalignment of the switching of those thyristors would create additional difficulty. In particular, any delay between the thyristors arranged on opposite sides of the winding would result in asymmetrical (eddy) currents the rotor surface.

To avoid the above issues with thyristors, a plurality of long conductors could be used to bridge opposite parts of the winding. The plurality of long conductors could actually be used to connect opposite parts of the winding in series or in parallel. Each of those long conductors would span half the circumference of the stator. The scheme shown on FIG. 3b of WO2006/103159 would require nine such conductors and nine bidirectional switches. Each of those conductors would need mechanical support and add another part of the stator winding that may eventually fail. That solution would be complex and impair the reliability of the electric generator.

The present disclosure is oriented towards providing the aforementioned needs and towards overcoming the aforementioned difficulties.

SUMMARY

The present disclosure is about improved stator windings for electric generators. To obtain a stator winding with an electrical frequency of $f_{el}=100$ Hz, a winding with polyphase output is modified into a wave winding. Known polygonal windings are similar to lap windings in that coils between bidirectional switches are connected in series. FIG. 4.18 of P. Sen, *Principles of Electric Machines and Power Electronics*, John Wiley and Sons, $2^{nd}$ edition, 1997, shows a stator winding arranged as a wave winding. In contrast to a lap winding, a wave winding no longer comprises series-connected coils arranged next to one another. Instead, each Z-shaped stator bar provides two end portions pointing in different directions. Z-shaped stator bars with opposite orientations are then connected pairwise at their end portions. This arrangement results in a winding arranged in a wave pattern. In this pattern, pairs of end-portions of connected Z-shaped stator bars form the crests of a wave.

To generate multi-phase output voltage and current, the stator bars need to be connected among each other. The wave winding disclosed herein connects opposite parts of a stator winding in series. Each stator bar on one side of the stator is electrically connected to a stator bar on the opposite side through Z-shaped end portions. The series-connected coils can then be connected to a terminal to provide polyphase output.

Each terminal provides one phase of the polyphase output of the electric generator. To produce three-phase output, the terminals can be connected to the busbars through bidirectional switches. In a preferred embodiment, the winding of the stator connects to the three-phase output of the generator through a matrix converter.

The disclosed winding arrangement largely eliminates the use of long conductors connect parts of the winding in parallel or in series. With the exception of four stator bars, all other stator bars are electrically connected to one another through the Z-end portions. To electrically close the circuit, only one long conductor is required. Compared to a polygonal winding with lap-wound coils, the number of long conductors is reduced from the number of bidirectional switches to only one.

The disclosed winding arrangement also avoids issues due to misalignment of switching times. The series-connected stator bars of opposite parts of the stator winding are connected directly. No bidirectional switch and, in particular, no thyristor is arranged in between these coils. Since there is no bidirectional switch, coils of opposite sides of the stator are part of the same electrical circuit and carry the same currents. Consequently, the issue with asymmetric (eddy) currents on the rotor surface is greatly reduced.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 1 is a schematic drawing of a lap winding with a plurality of eight parallel long conductors.

FIG. 2 is a schematic drawing of a polygonal winding modified into a wave winding.

FIG. 3 is a three-dimensional view of a winding as per FIG. 2.

DETAILED DESCRIPTION

FIG. 1 explains the difficulty involved in connecting the coils of a polygonal stator winding in parallel. The stator winding of FIG. 1 comprises only 16 slots (labeled 1 to 16) and has been modified in view of a four-pole rotor. The four-pole rotor implies that opposite sides of the winding both face either north poles or south poles of the rotor. Consequently, opposite sides of the winding experience substantially the same values and directions of magnetic flux.

The upper and the lower parts of the 16 slots are occupied by stator bars. Two end portions connect the stator bar 110 in the top part of slot 16 and the stator bar 110 in the bottom part of slot 12. The stator bar 110 arranged in the bottom of slot 12 connects to the stator bar 110 in the top part of slot 15 through another two end portion. This pattern continues for the rest of the lap winding.

FIG. 1 depicts 8 terminals (labeled 17 to 24). Those terminals connect opposite sides of the stator winding in parallel. Terminal 22 connects the coil portions in slots 12 and 15 and the coil portions in slots 4 and 7 in parallel.

FIG. 1 shows that eight connections would be necessary to connect opposite coils in parallel. Each connection would correspond to a terminal (17-24). Those eight connections would correspond to eight long conductors and each conductor would span half the circumference of the stator.

FIG. 2 shows the winding of FIG. 3b of WO2006/103159 modified in view of four poles. The winding shown on FIG. 2 is distributed over 54 slots just like the winding of FIG. 3b of WO2006/103159. The main difference between FIG. 1 and FIG. 2 is that the stator bars of FIG. 2 are laid out in a wave pattern. The bold lines in FIG. 2 illustrate that pattern. The stator bar in the top part of slot 77 connects to terminal 25 through a Z-shaped end portion. The same stator bar connects to the stator bar inside the bottom part of slot 91 through two Z-shaped end portions. The connection to the top part of slot 104 is made through yet another two Z-shaped end portions.

FIG. 2 also shows only one long conductor 52 is required to bridge terminal 51 and the stator bars of slots 91 and 77.

Unlike FIGS. 1 and 2, FIG. 3 gives a three-dimensional view of such a winding. FIG. 3 shows a view from the end portions of the winding depicted on FIG. 2. No stator core and no slots are depicted on FIG. 3. Instead, the stator winding is shown without the core of the stator. The cylindrical bore 109 in the centre of the stator winding is the stator bore. The rotor of a generator would normally be arranged inside the stator bore 109.

The long conductor 52 directly connects to terminal 25 of the stator winding. The other end 107 of the long conductor 52 connects to the stator bars in slots 77 and 91 through Z-shaped end portions.

FIG. 3 also shows a plurality of terminals 108. They 108 correspond to the terminals 25-51 shown on FIG. 2. Each of these terminals provides one phase of the polyphase output of the generator.

Although the present invention has been fully described in connection with preferred embodiments, it is evident that modifications may be introduced within the scope thereof, not considering the application to be limited by these embodiments, but by the contents of the following claims.

The invention claimed is:

1. An electric generator with a rotor and with a stator,
with the stator having a stator core with a stator bore,
with the stator core providing a plurality of stator slots arranged at a distance from one another,
with a winding comprising a plurality of stator bars inserted in the stator slots,
wherein
the winding provides polyphase output with more than three phases,
the electric generator comprises a plurality of terminals arranged solely at one semicircle of the stator bore,
at least four stator bars each comprise end portions pointing in different directions,
said stator bars form pairs, each pair comprising two stator bars on opposite sides of the stator and connected in series by one conductor bridging the semicircle of the stator bore without the plurality of terminals, and the end portions of said stator bars are directly connected to conduct the same current.

2. The electric generator according to claim 1, wherein the rotor comprises four poles.

3. The electric generator according to claim 1, wherein the number of phases of the polyphase alternating current is a multiple of three.

4. The electric generator according to claim 3, wherein the polyphase alternating current has got 9, 12, 18, 21, 24, or 27 phases.

5. The electric generator according to claim 1, wherein the number of slots is twice the number of phases of the polyphase output.

6. The electric generator according to claim 1, wherein one or two stator bars are arranged inside a stator slot.

7. The electric generator according to claim 6, wherein one stator bar is arranged in the top part of a stator slot and another stator bar is arranged in the bottom part of a stator slot.

8. The electric generator according to claim 1, wherein a matrix converter is at least partially integrated in the stator of the generator.

9. The electric generator according to claim 8, wherein the matrix converter provides bidirectional switches in the form of thyristors or insulated-gate bipolar transistors.

10. The electric generator according to claim 1, wherein the rotor turns at 3600 rpm or less.

11. The electric generator according to claim 10, wherein the rotor turns at 3000 rpm.

12. The electric generator according to claim 1, wherein the stator bore (109) is cylindrical.

13. The electric generator according to claim 1, wherein the stator slots extend axially along the length of the stator core and are open towards to stator bore.

* * * * *